Nov. 17, 1953 N. G. BRANSON 2,659,861
APPARATUS FOR ELECTRICAL THICKNESS MEASUREMENT
Filed Nov. 1, 1951
*FIG.1*
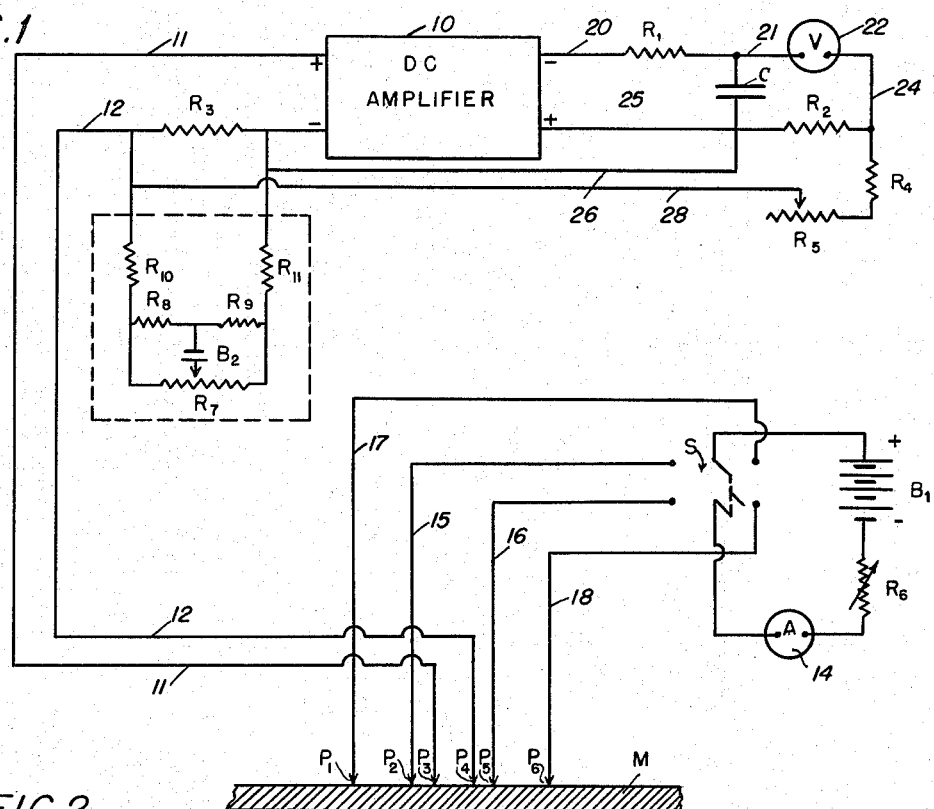
*FIG.2*
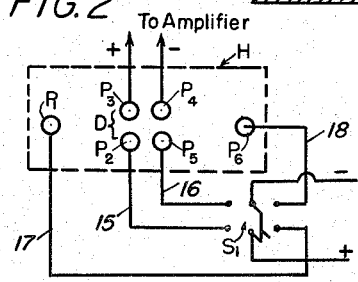
*FIG.4*
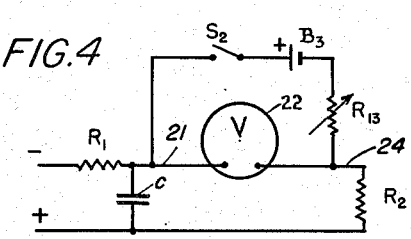
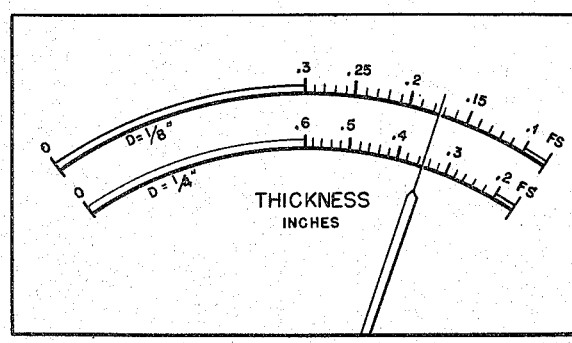
*FIG.3*
INVENTOR
Norman G. Branson
BY
Williams; Rich, Moorse
ATTORNEYS Patented Nov. 17, 1953

2,659,861

UNITED STATES PATENT OFFICE 2,659,861

APPARATUS FOR ELECTRICAL THICKNESS MEASUREMENT

Norman G. Branson, Stamford, Conn., assignor to Branson Instruments, Inc., Stamford, Conn., a corporation of Connecticut Application November 1, 1951, Serial No. 254,404

5 Claims. (Cl. 324—64)

This invention relates to the electrical measurement of the thickness of electrically conductive bodies from one side only and more particularly to apparatus for making such measurments.

U. S. Patent 1,895,643 to Putnam describes a method of measuring thickness by sending a known current into a metal plate through two spring loaded contact points and measuring the potential developed at two other spring loaded contact points suitably spaced from the current applying points. The use of separate contact points for applying the current and for measuring the potential eliminates errors due to contact resistance. The potential which is developed at the measuring points is proportional to the current and the resistivity of the plate and is an inverse function of the plate thickness. Since the plate resistivity is usually an unknown factor or subject to substantial variations due to temperature, this method is subject to large errors. This method has been further developed as described in a paper by B. M. Thornton and W. M. Thornton entitled "The measurement of the thickness of metal walls from one surface only" published in "Proceedings," Inst. Mechanical Engineers, London, October-December 1938, page 349 at 387 et seq., wherein a method is described in which current is applied to the metal through a pair of contacts and measurement of potential is made through two other pairs of contacts having different spacings, the thickness being determined from the ratio of the two potential readings. This ratio is also a function of metal thickness but is independent of metal resistivity. This method used a sensitive light-beam type of galvanometer to measure the relatively small voltages developed at the potential contacts. Others have used various types of electronic amplifiers to eliminate the necessity for the galvanometer. The methods and apparatus which have heretofore been used and described in the literature all require, however, reference to tables or curves and calculations for each thickness reading.

The principal object of the present invention is to provide equipment which is simple to operate and which provides a direct indication of metal thickness which can be read on a meter dial without calculations or the use of tables or curves. The apparatus of the invention requires a minimum of operator training and skill, eliminate sources of errors, greatly increase the speed of operation, and overcome operating difficulties which are inherent in previously known equipment when used under practical operating conditions.

For a better understanding of the invention the present preferred embodiment thereof will be described in detail, for purposes of illustration, in connection with the drawings, in which, Fig. 1 is a schematic circuit diagram of apparatus operating in accordance with what may be called the voltage-ratio fixed-current method;

Fig. 2 is a diagrammatic representation of a part of the circuit showing in particular one form of contact arrangement;

Fig. 3 illustrates one form of suitably calibrated meter dial adapted for indicating thickness in two different thickness ranges; and Fig. 4 is a diagram of a portion of the circuit illustrated in Fig. 3 embodying a modification enabling the full scale of the meter to be used for thickness measurement indications.

Referring to Figs. 1 and 2, the apparatus comprises a number of contacts $P_1$, $P_2$, $P_3$, $P_4$, $P_5$ and $P_6$ adapted to make good electrical contact with one surface of the metal or other conductive material M to be measured or tested. These contacts are mounted in a suitable holder so as to be spring-pressed against the surface of the metal, such a holder being described in U. S. Patent No. 2,476,943 to G. T. Brady. The holder is indicated in Fig. 2 at H. An infinite number of possible contact arrangements may be used, the contacts being arranged either linearly or grouped as shown in Fig. 2, subject to certain spacing requirements hereinafter described. In any event, they are arranged in pairs. Contacts $P_3$ and $P_4$, herein called the potential contacts, supply the minute current picked off of the surface of the metal to an amplifier 10. Contact $P_3$ is connected directly to the input of the amplifier through wire 11 and contact $P_4$ is connected through wire 12 and resistance $R_3$ to the input of the amplifier. A source of electric current such as battery $B_1$ is connected to the center terminals of a double-pole double-throw switch $S_1$ through a variable resistance $R_6$ and a current-measuring instrument such as the ammeter 14 so that the same value of current may be applied to the two pairs of current contacts. The contacts $P_2$ and $P_5$, which will be referred to as the inner pair of current-supplying contacts, are connected through the wires 15 and 16 to one side of switch $S_1$ and the contacts $P_1$ and $P_6$, which will be referred to as the outer pair of current-supplying contacts, are connected through wires 17 and 18 to the other side of switch $S_1$.

It will thus be evident that current can be supplied to the surface of the material M alternately through the inner and outer pairs of current-supplying contacts $P_2$—$P_5$ or $P_1$—$P_6$, and that by means of resistance $R_6$ and ammeter 14 this current can be adjusted to have the same value when directed through either pair of contacts. It will also be evident that when there is any potential developed across the contacts $P_3$ and $P_4$, in the absence of applied current, such as thermal or contact potential, its existence may be determined by leaving the switch S in open position and referring to the meter hereinafter described. It is desirable to eliminate such potential before proceeding with measurement in a manner to be explained.

Contacts $P_2$ and $P_5$ are spaced from the contacts $P_3$ and $P_4$ respectively by a distance D which is about the same as the minimum thickness of the body to be measured. Contacts $P_1$ and $P_6$ are spaced from the contacts $P_2$ and $P_5$ respectively by approximately a distance which is equal to or greater than the maximum thickness which the device will be required to measure. The reason for such spacing is that if the ratio of D to thickness is much more than 1, the voltage between $P_3$ and $P_4$ will be approximately the same with the current applied through either pair of current supplying contacts and the ratio of voltages will always be approximately unity though thickness varies. If the body to be measured is several times thicker than the distance D, the voltage, when the current is flowing in at contacts $P_1$ and $P_6$, will be half or less of what it is when the current is flowing in at contacts $P_2$ and $P_5$ and the voltage ratio, which then is a function of thickness, will be two or more. The exact ratio for any given thickness depends on the contact configuration and spacing. A convenient arrangement of the contacts is shown in Fig. 2 where the closely spaced contacts, namely the inner pair of current contacts and the measuring contacts, are arranged at the corners of a square and the outer pair of current contacts $P_1$ and $P_6$ are symmetrically arranged with reference to this central group.

A number of different heads or probes may be provided for use as part of the apparatus, having different spacings and arrangements of contacts suitable for measuring different ranges of thickness and for each probe a corresponding scale is provided on the thickness indicating meter.

In the illustrative embodiment shown, the current applied to the metal is direct current and it will be understood that the potentials developed between the measuring contacts $P_3$ and $P_4$ are very minute, being of the order of a few microvolts. To amplify the very small resulting current, a polarity sensitive direct current amplifier 10 of the breaker-modulated type is used. Suitable amplifiers of this type are described in U. S. Patents 2,114,298 to Ross and Gunn and 2,143,788 to Sargeant and Hoepper, and a suitable small-voltage interrupter or breaker capable of use in my apparatus with such amplifiers is described in Patent No. 2,442,299 to Liston and Quinn.

The output from the negative side of the amplifier is directed through wire 20, resistance $R_1$ and wire 21 to one terminal of a voltmeter 22, the other terminal being connected through wire 24, resistance $R_2$ and wire 25 to the positive output side of the amplifier. A filtering condenser C is bridged across wires 21 and 25.

The amplifier gain control is of the continuously variable type which controls the inverse feedback from the output of the amplifier to its input circuit. This control comprises wire 26 connecting the positive output to the negative input of the amplifier and the fixed resistance $R_4$ and variable resistance $R_5$ connected by wire 28 to the terminal of the resistance $R_3$ remote from amplifier 10. This type of inverse feed-back gain control greatly increases amplifier stability and also increases the effective input resistance of the amplifier circuit. While it reduces the over-all gain of the amplifier it greatly reduces the effect on measurements of uncontrolled changes in gain due to variables within the amplifier itself during the making of measurements.

In devices of this kind, another source of error is to be found in thermal and contact potentials. Others have sought to eliminate their effect by averaging two readings taken with the current applied to the object to be measured in opposite directions, that is by reversing its polarity between readings, thus requiring an added computation. In accordance with one aspect of this invention such potentials are initially eliminated by means of a bucking current applied across resistor $R_3$ which is, for example, 1 ohm. This circuit consists of battery $B_2$, resistors $R_8$ and $R_9$ and potentiometer $R_7$, connected as shown, and connected across resistor $R_3$ through dropping resistors $R_{10}$ and $R_{11}$. With switch $S_1$ open and the contacts in place on the work, the bucking current is adjusted as to value and polarity to produce a zero reading on meter 22. Thereafter the thickness measurement is immediately made in the following manner, with assurance that it is not erroneous by reason of contact or thermal potentials.

Utilizing the above described apparatus, the method of determining thickness involves the following steps:

The probe or head carrying the contacts $P_1$ through $P_6$ is applied to one surface of the conductive body to be measured, the surface having been cleaned to provide good electrical contact.

Any deflection of meter 22, resulting from contact or thermal potentials, is balanced out by adjustment of potentiometer $R_7$ of the bucking circuit so that the meter is at its electrical and mechanical zero.

Switch $S_1$ is then moved to apply current from battery $B_1$ to the inner pair of current contacts $P_2$ and $P_5$. The current is adjusted by $R_6$ to any convenient value, say 4 amps., and the amplifier gain is adjusted by $R_5$ to give a full scale reading on meter 22, marked FS in Fig. 3.

Switch $S_1$ is then reversed to connect the outer pair of current contacts $P_1$ and $P_6$ to the current supply, the current value is adjusted, if necessary, to be the same as that applied to contacts $P_2$ and $P_5$, and the thickness is read directly on the appropriate calibrated scale of meter 22.

By reason of the fact that thickness is determined from the ratio of two voltages, measurement is independent of the conductivity of the body being measured and hence the device may be used to measure the thickness of all metals and other conductive materials.

As may be seen from Fig. 3, where two scales are shown, each scale is identified as pertaining to the contact spacing of a particular probe. The top scale is marked $D=\frac{1}{8}''$ identifying a probe in which the inner contact spacing D is $\frac{1}{8}''$. The other scale is read when a probe with inner contact spacing of $\frac{1}{4}''$ is used. These scales are calibrated by taking measurements with their respective probes on plates of known thickness. It will be noted that the lower half of each scale is blocked off for the reason that with the circuit of Fig. 1 only about half of the scale length will be usable since the voltage ratio giving the lowest reading will be about 2:1 or half scale. However, if it is desired to utilize nearly the whole scale it may be expanded by applying a potential across the meter to suppress its electrical zero as illustrated in Fig. 4 which shows a source of bucking voltage $B_3$, an adjustable resistance $R_{13}$ and a switch $S_2$. This switch is mechanically coupled with switch S, so as to be closed only when current is applied to the probe contacts.

While the foregoing apparatus has been described primarily as a thickness measuring device it may be used for other purposes such as the detection and location of flaws.

Attention is directed to the advantageous simplicity of the measurement operation. Only a single contact-carrying head or probe is required for taking measurements within a given range. It is applied to the surface and the meter is adjusted to zero by the bucking circuit control with the control switch $S_1$ open and then to full scale reading with the control switch in one closed position. Then by merely throwing this switch to its other closed position the thickness is directly indicated on the meter.

The foregoing description is to be taken merely as an illustration and not as a limtiation on the invention as hereinafter defined in the claims.

What is claimed is:

1. Apparatus for measuring the thickness of a conductive body from one side only comprising: means for applying simultaneously to said side three pairs of contacts namely, a pair of potential contacts, an inner pair of current-supplying contacts spaced therefrom by a distance not substantially greater than the minimum thickness to be measured and a pair of outer current-supplying contacts spaced apart by a greater distance than said inner current-supplying contacts; means for supplying current of predetermined value selectively to said inner and outer pairs of contacts; an adjustable amplifier for the current flowing through the potential contacts; and a meter connected to the output of said amplifier and having a scale calibrated to indicate thickness with relation to the specific arrangement of contacts used therewith.

2. Apparatus for measuring the thickness of a conductive body from one side only comprising: means for applying simultaneously to said side three pairs of contacts namely, a pair of potential contacts, an inner pair of current-supplying contacts spaced therefrom by a distance not substantially greater than the minimum thickness to be measured and a pair of outer current-supplying contacts spaced by a greater distance than said inner current-supplying contacts; an adjustable bucking circuit adapted to neutralize contact and thermal potentials existing across said potential contacts; means for supplying current of predetermined value selectively to said inner and outer pairs of contacts; an amplifier for the current flowing through the potential contacts having a gain control; and a meter connected to the output of said amplifier and having a scale calibrated to indicate thickness with relation to the specific arrangement of contacts used therewith.

3. Apparatus for measuring the thickness of a conductive body from one side only comprising: means for applying simultaneously to said side three pairs of contacts namely, a pair of potential contacts, an inner pair of current-supplying contacts spaced therefrom by a distance not substantially greater than the minimum thickness to be measured and a pair of outer current-supplying contacts spaced from said inner contacts by a distance greater than the maximum thickness to be measured; means for supplying current of predetermined value selectively to said inner and outer pairs of contacts; an amplifier for the current flowing through the potential contacts having a continuously variable gain control; and a meter connected to the output of said amplifier and having a scale calibrated to indicate thickness with relation to the specific arrangement of contacts used therewith.

4. Apparatus for measuring the thickness of a conductive body from one side only comprising: means for applying simultaneously to said side three pairs of contacts namely, a pair of potential contacts, an inner pair of current-supplying contacts spaced therefrom by a distance not substantially greater than the minimum thickness to be measured and a pair of outer current-supplying contacts spaced apart by a greater distance than said inner current-supplying contacts; means for supplying current of predetermined value selectively to said inner and outer pairs of contacts; an amplifier for the current flowing through the potential contacts, and a continuously variable inverse feed-back gain control for said amplifier; and a meter connected to the output of said amplifier and having a scale calibrated to indicate thickness with relation to the specific arrangement of contacts used therewith.

5. In apparatus for electrically measuring metal thickness from one side only, in combination, a probe having contacts arranged in pairs to apply current to said side through two different distances; measuring means including a pair of potential contacts also carried by said probe, means for amplifying the current flowing through said potential contacts, and a meter associated with the output of said amplifying means and having a scale calibrated to read thickness; means for applying a current of fixed value to both pairs of current contacts in succession, and means for adjusting the amplifying means to produce a full scale reading on said meter when said current is applied to the more closely spaced pair of current contacts; whereby thickness is indicated by said meter when the current is applied through the more widely spaced pair of current contacts.

NORMAN G. BRANSON.

References Cited in the file of this patent

UNITED STATES PATENTS

| Number | Name | Date |
|---|---|---|
| 2,142,619 | Sciaky | Jan. 3, 1939 |
| 2,186,826 | Edgar | Jan. 9, 1940 |
| 2,195,504 | Stone | Apr. 2, 1940 |
| 2,459,730 | Williams | Jan. 18, 1949 |
| 2,476,943 | Brady | July 19, 1949 |
| 2,586,868 | Scott | Feb. 26, 1952 |

FOREIGN PATENTS

| Number | Country | Date |
|---|---|---|
| 285,536 | Germany | July 1, 1915 |